C. J. CLARKE.
SHORT TURNING TRUCK.
APPLICATION FILED JUNE 9, 1913.
1,133,838.
Patented Mar. 30, 1915.
3 SHEETS—SHEET 1.
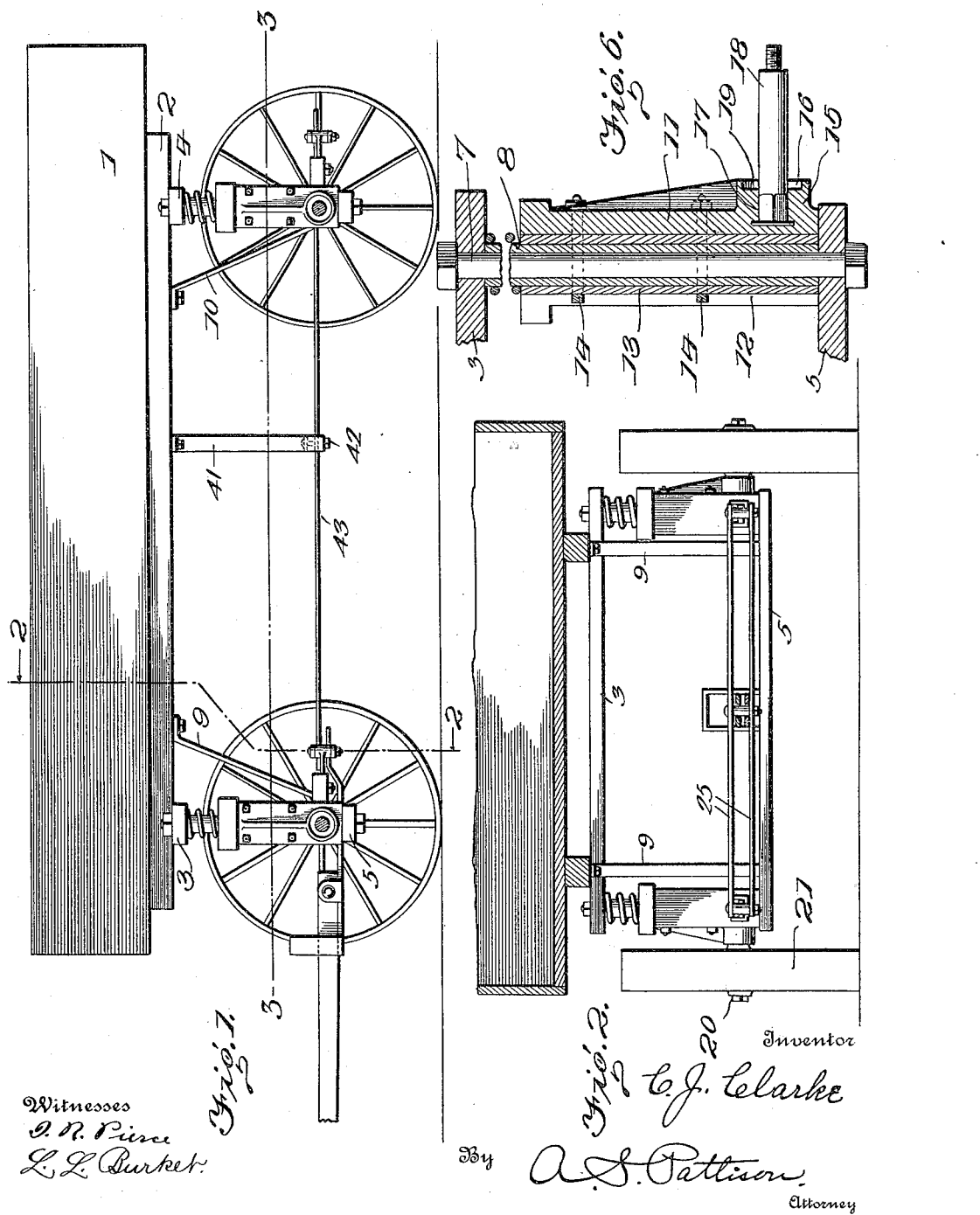

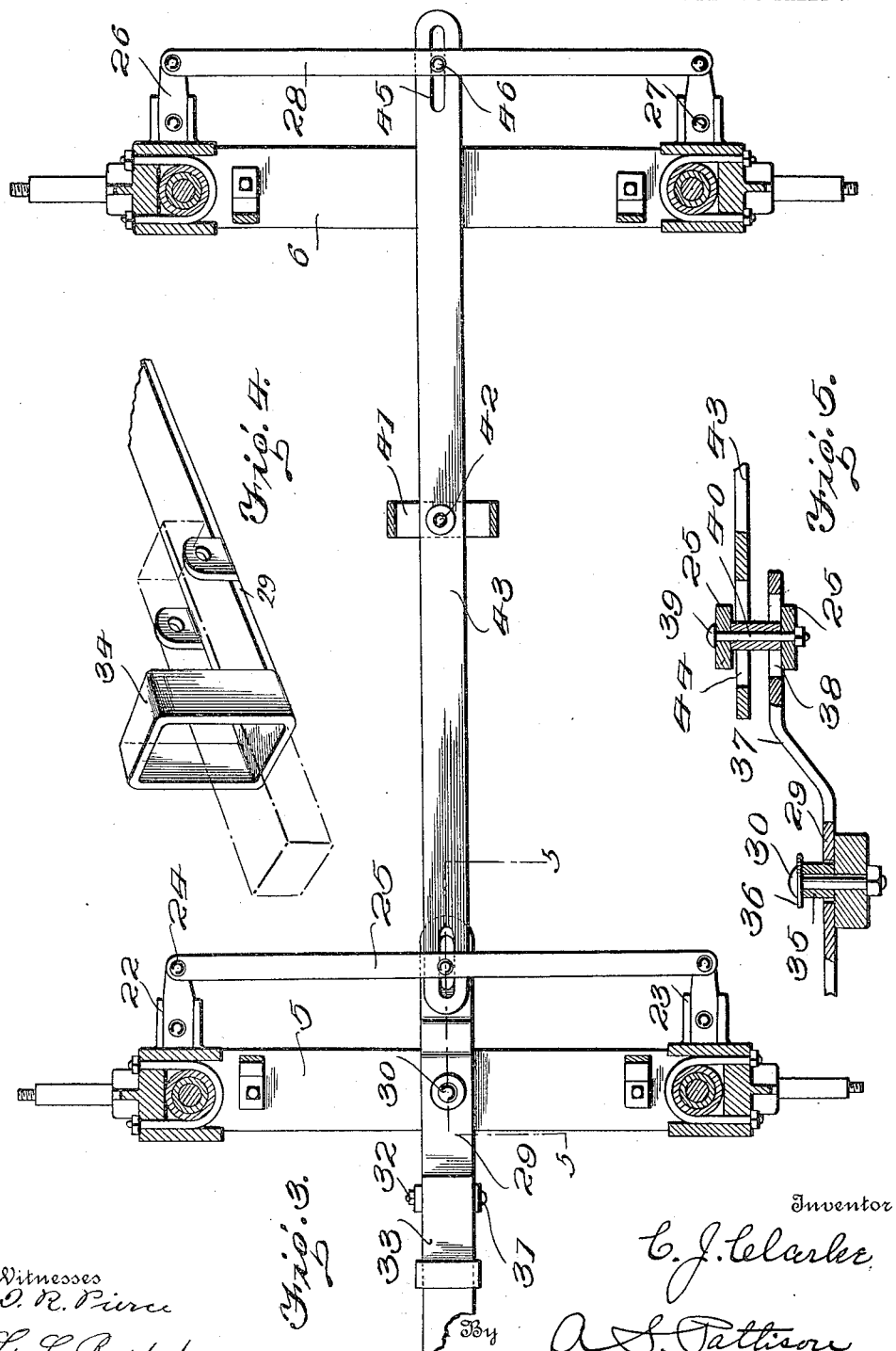

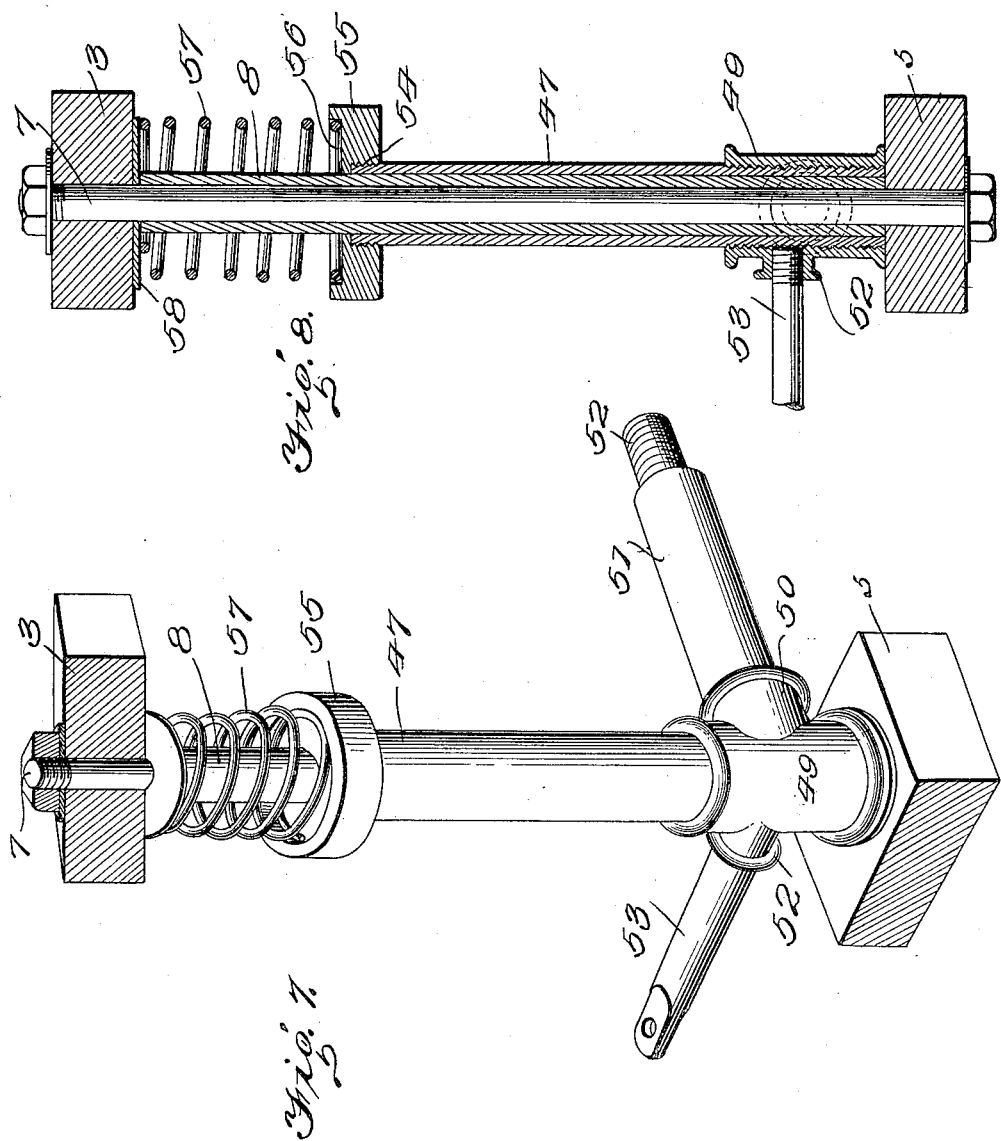

UNITED STATES PATENT OFFICE.

CHARLES JACKSON CLARKE, OF KINGSBURG, CALIFORNIA.

SHORT-TURNING TRUCK.

1,133,838. Specification of Letters Patent. Patented Mar. 30, 1915.

Application filed June 9, 1913. Serial No. 772,606.

*To all whom it may concern:*

Be it known that I, CHARLES J. CLARKE, a citizen of the United States, residing at Kingsburg, in the county of Fresno and State of California, have invented certain new and useful Improvements in Short-Turning Trucks, of which the following is a specification, reference being had therein to the accompanying drawing.

My invention relates to improvements in short turning trucks.

The object of my invention is to provide a truck in which the axle spindles are mounted to oscillate on a vertical shaft and coupled together so that the turning of the wagon pole on the vehicle will cause the two front spindles to turn in one direction and the two rear spindles in the opposite direction to cause the rear wheels to travel in the same path or track as the front wheels and thus provide a truck in which the rear wheels will clear any object cleared by the front wheels in making a turn.

Another object of my invention is to provide a truck of this character in which the wheel spindles and their oscillating members are vertically movable and normally held in a downward position by springs in order to give the body of the vehicle the proper resiliency, and whereby the axle spindles are independently vertically movable.

A still further object of my invention is to provide a simple, cheap and more effective truck of this character having certain details of structure hereinafter more fully described.

In the accompanying drawings: Figure 1 is a side elevation of my improved truck, showing the front and rear wheels on one side of the truck removed. Fig. 2 is a vertical transverse sectional view taken on the lines 2—2 of Fig. 1. Fig. 3 is an enlarged horizontal sectional view taken on the line 3—3 of Fig. 1. Fig. 4 is a horizontal perspective view of the tongue-attaching means. Fig. 5 is a vertical longitudinal sectional view taken on the line 5—5 of Fig. 3 and showing the connection between the tongue-carrying member and the spindle operating levers. Fig. 6 is an enlarged vertical sectional view showing a means by which the spindle is supported to oscillate on the vehicle. Fig. 7 is an enlarged perspective view showing a modified form of means for mounting the spindle between the bolts. Fig. 8 is a vertical sectional view of Fig. 7.

Referring now to the drawings, 1 represents the body of my improved truck which is provided with two longitudinally extending bars 2, mounted upon the forward bolster 3 and the rear bolster 4. The longitudinal bars 2 are rigidly attached to the bolsters in any desired manner and the bolsters extend some distance beyond the said bars on each side.

Directly below the bolsters 3 and 4 are transverse bars 5 and 6, connected by vertical bolts 7 and between the bolsters and the bars and surrounding the bolts are sleeves 8, whereby the bolsters and bars are held the desired distance apart. In order to brace and prevent any twisting of the bars 5 and 6, I provide the braces 9 and 10, which have their lower ends connected to the bars 5 and 6, and their upper ends connected to the longitudinal bars 2 of the body of the vehicle.

The sleeves 8, as heretofore described, are clamped between the bolsters and bars and held against rotation. Surrounding said sleeves are the spindle carrying members 11, which are of a length less than the distance between the bars 5 and 6 and the bolsters 3 and 4. There being four bolts 7 and sleeves 8, there are four spindle carrying members 11, one for each wheel, as will be hereinafter more fully described. The spindle carrying member 11 surrounds the sleeves 8 and has one side open as indicated at 12, and in which fits a sleeve 13, through which the sleeve 8 passes, and said sleeve 12 is held within the member 11 by means of U-shaped clamps 14. By this arrangement it will be seen that the sleeve 13 can be readily removed from the member 11 when it becomes worn and replaced by a new sleeve. The turning of the vehicle, as is readily understood, turns the sleeve 13 on the sleeve 8 and all the wear is on the two sleeves and by the structure shown in Fig. 6, the sleeves can be readily removed and replaced when they become worn. Surrounding the sleeve 8, between the bolts and the upper ends of the spindle-carrying members 11 are coiled springs which normally hold the spindle-carrying members in their downward position upon the sleeves. By this structure it will be seen that any pressure or unevenness in the ground over which the vehicle passes is taken up by these springs and thus producing an even running vehicle having all the qualifications of the ordinary leaf spring vehicle. The lower ends of the spindle-carrying members 11 are each provided with a boss 15 having an enlarged recess formed therein in the center of which is a small depression or recess 17, in which is cast the axle-spindle 18. This axle-spindle, as shown, in Fig. 6 of the drawing, is cast in the member 11, in order that it cannot turn and the recess 16 forms a sand-band 19 adapted to surround the hub 20 of the wheel 21 to prevent any dirt or grit from passing to the spindle.

As heretofore stated there are four of these spindle-carrying members one mounted on each of the four bolts 7 or sleeve 8. The two forward carrying-spindle members 11 are each provided with rearwardly extending lugs 22 and 23, which are preferably formed integral with the member and have pivotally connected at 24, the transverse bars 25 spaced apart. The two rear spindle carrying members are provided with the rearwardly extending lugs 26 and 27 having pivotally connected at their outer ends the transversely spaced bars 28, the same being constructed and arranged like that of the two front spindle-carrying members.

Pivotally carried by the front bar 5, is a tongue-carrying member 29. This member is pivoted at 30 to the bar 5 and extends a distance forward of the bar and is provided with upwardly extending ears 31, through which extends the bolt 32, by means of which the tongue 33 is pivotally mounted within said member. In front of said bolt the member 29 is provided with a loop 34, which is of a length greater than the thickness of the tongue, whereby the tongue is readily locked upon the bolt 32 for a purpose later described.

The bolt 30, upon which the tongue-carrying-member 29 is pivoted, is provided with a sleeve 35 and a washer 36, whereby said member 29 has a limited vertical movement upon its pivot, as fully shown in Fig. 5. The said tongue-carrying-member in rear of the bar 5, is bent upwardly at 37 and provided with an elongated opening 38. Passing vertically through the bars 25 is a bolt 39 having a sleeve 40, which bears against the said bars 25 and holds them in their spaced relation. This sleeve passes through the opening 38 in the rear end of the tongue-carrying member 29.

The lower face of the bars 2 is provided with a downwardly extending loop 41 to which is pivotally connected at 42 a lever 43. This pivotal connection 42 between the loop 41 and the lever 43 is constructed similar to the connection between the bars 25 in order that the lever 43 may have a vertical movement on the loop. The forward end of the lever is provided with a slot through which the sleeve 40 on the bolt 39 passes. The rear end of the lever 43 is provided with an elongated slot 45, through which passes a bolt 46, carried by the rear connecting links or bars 28 in the same manner as that of the bars 25, in order that the rear end of the lever 43 may have a vertical movement.

In a vehicle of this character, it will be seen that the spindle carrying member being vertically movable it is necessary to have the tongue-carrying member 29, the bars 25 and 28 and the lever 43 vertically movable independent of the members 5 and 6, in order that any one or all of the spindle-carrying members may move vertically at any time without causing any twisting or binding of the same.

My truck is more especially designed for use in vineyards or orchards and by the structure herein shown and described it will be seen that all it is necessary to do in driving through a vineyard or orchard is to clear the front wheels and the rear wheels will likewise clear. This result is accomplished in the following manner: The tongue-carrying member 29 is moved or turned upon its pivot 30, by means of the animals carrying the vehicle and the rear end beyond the pivot 30 engages the sleeve 40, carried by the bars 25 and throws the two forward spindles in the same direction. This movement likewise throws the forward end of the lever 43 in the same direction as the bars 25 and the same being pivoted at 42, the rear bars 28 are thrown in the opposite direction to that of the bars 25, throwing the rear spindles in the opposite direction from the forward spindles and causing the rear end of the truck to swing out around the tree or vine or other object around which it is desired to drive.

In the modification shown in Figs. 7 and 8, I mount on the tube 8 between the bolsters 3 and 5 a sleeve 47 which is free to oscillate on the tube 8 and has its lower end screw-threaded through the pipe connection 49 and extends down flush with the lower end thereof. This pipe connection 49 is provided with a threaded extension 50 into which is screwed the spindle 51 which has its outer end screw-threaded at 52 and upon which is screwed a nut for holding the wheel on the spindle. The connection 49, has extending at right angles at 50 an extension 52 which is screw-threaded and into which is screwed the operating lever 53. The upper end of the sleeve 47 is screw-threaded at 54 and upon which is screwed an enlarged circular member 55 having a recess 56 in its upper face. Surrounding the tube 8 is a coiled spring 57, which has its upper end bearing against a washer 58 surrounding the bolt 7 and against which the spring bears. The lower end of the spring 57 enters the recess 56 of the member 55 and normally holds the sleeve 47 carrying the spindle in its downward position. The lever 53 has connected at its outer end the bars 25 or 28 depending upon whether it is used for a front or rear axle and the operation of the device is precisely the same as that shown in the preferred form. This form of spindle carrying member has been found to be simple in construction and has all of the advantages of the preferred form.

Having thus described my invention, what I claim and desire to secure by Letters Patent is:

1. A short turning truck comprising a body, bolsters carried by the body, transverse bars below the bolsters, bolts connecting the bolsters and the transverse bars and holding the same in their spaced relation, spindle-carrying members mounted upon the bolts, and adapted to oscillate thereon, and means for oscillating the forward spindle-carrying members in an opposite direction to that of the rear carrying members.

2. A short turning truck comprising a body, bolsters carried thereby, transverse bars below the bolsters, bolts connecting the transverse bars and the bolsters at their outer ends and having sleeves clamped between the bolsters and the transverse bars, spindle-carrying members vertically movably mounted upon the said sleeves and adapted to oscillate thereon, and means for oscillating the forward spindle carrying members in the opposite direction to that of the rear spindle-carrying members, substantially as shown and described.

3. A short turning truck comprising a body, bolsters carried thereby, vertically disposed bolts carried by the outer ends of the bolsters, spindle-carrying members oscillating on said bolts and vertically movable thereon, springs surrounding the bolts for normally holding the spindle-carrying members in their downward position, and a tongue-carrying member constructed and arranged to oscillate the forward spindle-carrying members in one direction and the rear carrying members in the opposite direction.

4. A short turning truck comprising a body, bolsters carried by the body, bars below said bolsters, bolts connecting the bars and the bolsters, spindle-carrying members vertically movable upon the bolts and adapted to oscillate thereon, arms carried by the rear faces of the spindle-carrying members, rods connecting said arms, an intermediately pivoted lever having a sliding connection with the said rods, and a tongue carrying member pivoted to the forward bar and having a sliding connection with the lever, substantially as shown and described.

5. A short turning truck comprising a body portion, bolsters carried by the body, transverse bars below the bolsters, vertically disposed rods connecting the outer ends of the bolsters and bars, sleeves on the bolts between the bars and the bolsters for holding them in their spaced relation, a spindle carrying member surrounding the sleeves and having a vertical and oscillating movement thereon substantially as shown and described.

6. A short turning truck comprising a body, bolsters carried by the body, bars directly below the bolsters, bolts connecting the bars and the bolsters, sleeves surrounding the bolts and clamped between the bars and the bolsters by the bolts, elongated spindle-carrying members surrounding the sleeve and of a length less than the distance between the bars and the bolsters, a coiled spring surrounding the sleeve carried by the bolts and normally holding the spindle-carrying members in their downward position, and means for oscillating the forward spindle in one direction and the rear spindles in the opposite direction.

7. A short turning truck comprising a body, bolsters carried by the body, cars directly below the bolsters, bolts connecting the outer ends of the bars and bolsters, sleeves surrounding the bolsters and clamped between the bars and bolsters for holding them in their spaced relation, oscillating spindles carrying members vertically movably mounted on said sleeves, coiled springs surrounding the sleeves between the bolsters and the spindle carrying members, and means for operatively connecting the spindle-carrying members, substantially as shown and described.

8. In a short turning truck, comprising a body, oscillating spindle-carrying members carried by the body, a bar connecting the two forward spindle-carrying members, a bar connecting the two rear-spindle-carrying members, a lever intermediately pivoted to the body and having a slidable connection with the bar connecting the forward spindle-carrying members, and a sliding connection with the bars connecting the rear spindle-carrying members, a tongue-carrying member pivoted to the body and having an extended rear end having a slidable connection with the bar connecting the two forward spindle-carrying members, whereby the turning of the said tongue-carrying member moves the two forward spindles in one direction and the two rear spindles in the opposite direction.

9. A vehicle, comprising a body, bolsters carried by the said body, a bolt connecting the bolsters, a sleeve surrounding the bolt and clamped between the bolsters, a vertically movable spindle-carrying member surrounding the sleeve and having an outwardly extending screw-threaded extension, a spindle screwed within said extension and an extension carried by the spindle carrying member at right angles to the spindle and a lever screwed therein, substantially as shown and described.

10. A vehicle, comprising a body, bolsters carried by the body, bolts connecting the bolsters, sleeves surrounding the bolts and clamped between the bolsters, spindle-carrying members surrounding the sleeves, a spring surrounding the sleeve and normally holding the spindle-carrying members in their downward position, said spindle carrying members composed of a vertically disposed pipe screwed through a coupling, spindles screwed into the coupling and levers screwed into the coupling at right angles to the spindle.

11. A short turning truck comprising a body, bolsters carried by the body, bars below said bolsters, bolts connecting the bars and the bolsters, spindle carrying members vertically movable upon the bolts and adapted to oscillate thereon, arms carried by the rear faces of the spindle carrying members, rods connecting said arms and a tongue-carrying member pivoted to the forward bar and adapted to operate the rods connecting the said arms, whereby the forward spindle carrying members are moved in the opposite direction to the rear spindle carrying members.

12. A short turning truck comprising a body, bolsters carried by the body, bars below said bolsters, vertically disposed bolts connecting the outer ends of the bars and bolsters, sleeves mounted on the bolts between the bars and bolsters and holding the same in their spaced relation, spindle carrying members vertically movable and oscillating on said bolts between the bars and the bolsters, rods connecting the two spindle carrying members, bars connecting the two rear spindle carrying members, an intermediate pivoted lever connected at its forward and rear ends to the bars, connecting the spindle carrying members and having a vertically movable connection therewith, a tongue carrying member pivoted intermediate its ends and its rear end connected to the lever, whereby the turning of the said tongue carrying member moves the two forward spindles in one direction and the two rear spindles in the opposite direction.

In testimony whereof I hereunto affix my signature in the presence of two witnesses.

CHARLES JACKSON CLARKE.

Witnesses:
G. W. BOYLE,
DAVID PROPES.

Copies of this patent may be obtained for five cents each, by addressing the "Commissioner of Patents Washington, D. C."